United States Patent

[11] 3,621,399

[72] Inventors Gerald Rabow
Nutley, N.J.;
Albert M. Klein, Chatsworth, Calif.

[21] Appl. No. 764,800
[22] Filed Oct. 3, 1968
[45] Patented Nov. 16, 1971
[73] Assignee International Telephone and Telegraph Corporation
Nutley, N.J.

[54] SYNCHRONIZATION SYSTEM FOR A SYNCHRONOUS RECEIVER
10 Claims, 1 Drawing Fig.

[52] U.S. Cl. .......... 325/321, 325/419, 325/420
[51] Int. Cl. .......... H04b 1/16, H03k 1/9, H041 1/7
[50] Field of Search .......... 325/321, 419, 420; 178/69.5; 179/15 BS

[56] References Cited
UNITED STATES PATENTS
3,206,681 9/1965 Brown .......... 325/321

*Primary Examiner*—Robert L. Griffin
*Assistant Examiner*—Kenneth W. Weinstein
*Attorneys*—C. Cornell Remsen, Jr., Walter J. Baum, Percy P. Lantzy, Philip M. Bolton, Isidore Togut and Charles L. Johnson, Jr.

ABSTRACT: A receiver mater oscillator is synchronized to a received signal including a carrier signal predeterminately coded at a subcarrier signal rate and the subcarrier by generating a local carrier signal coded according to the predetermined code and a local subcarrier signal. The local coded carrier signal synchronously detects the received signal. When the phase difference of the received and local carrier signals is outside a given range of phase differences, the drive signal frequency cooperating to generate the local coded carrier signal is varied until the phase difference is within the given range at which time the local subcarrier signal becomes the drive signal. During this phase adjustment, a phase loop adjusts the phase of the output signal of the master oscillator. When the phase difference is with the given range, a phase detector compares the phase of the received subcarrier signal derived from the loop with the local subcarrier signal and a decision circuit coupled thereto provides an output signal for control of a switching arrangement in the loop to open the loop and apply a step voltage of proper polarity to the oscillator for achievement of the desired synchronization.

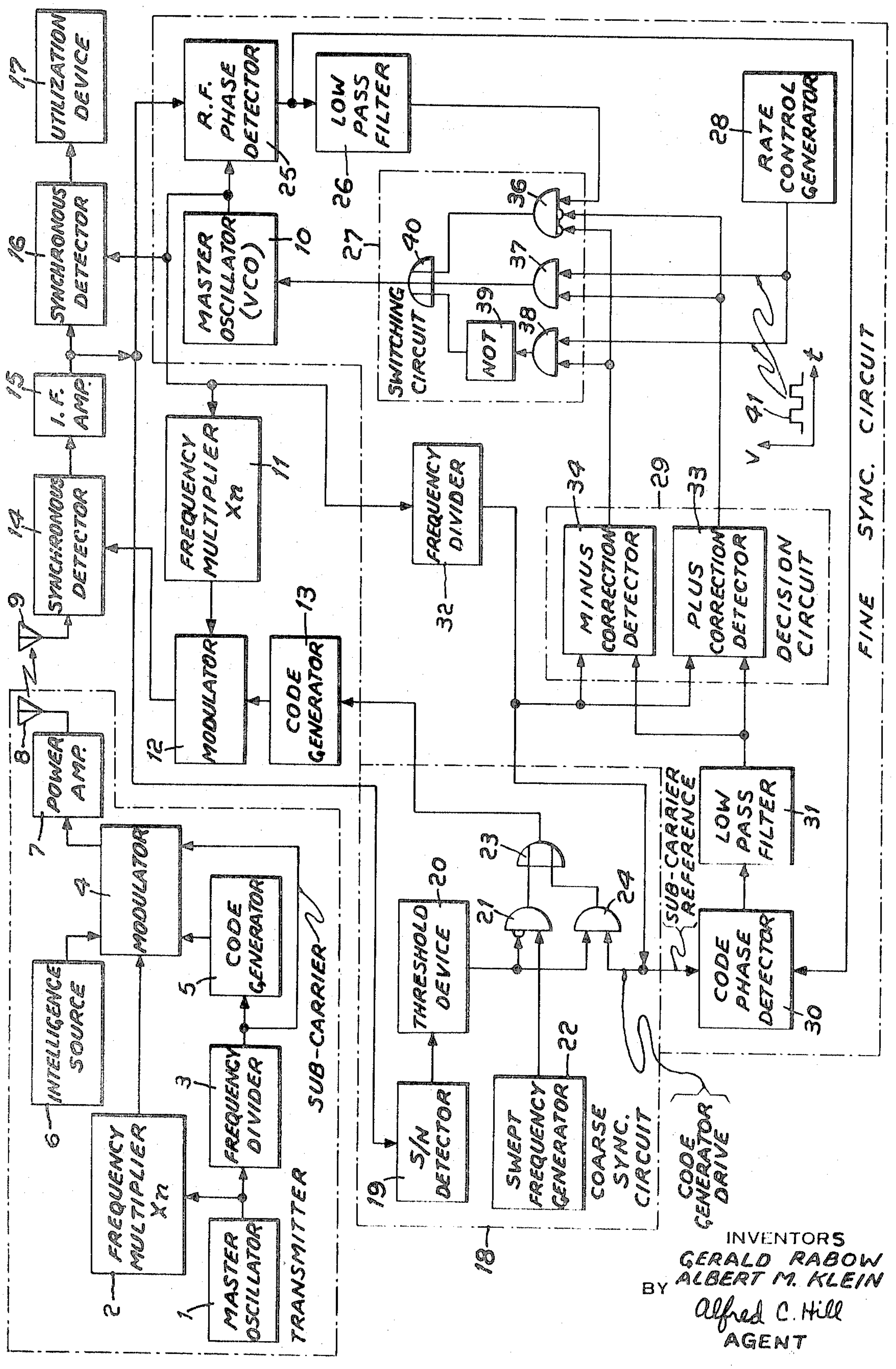
INVENTORS
GERALD RABOW
ALBERT M. KLEIN
BY Alfred C. Hill
AGENT

SYNCHRONIZATION SYSTEM FOR A SYNCHRONOUS RECEIVER

BACKGROUND OF THE INVENTION

This invention relates to synchronous communication systems and more particularly to a synchronization system employed at the receiver end of the synchronous communication system.

In many applications of present-day communication systems there is a requirement of random access to the communication propagation paths by a plurality of stations requiring communication therebetween. To permit this random access to the propagation paths, it is required that a code be employed, which may be termed an address code, so that one station can address another station to establish communication between these two stations on a random access basis to the propagation medium. In such a system, each station would have its own address code and, therefore, can provide the desired communication between two stations of a plurality of stations, all of which have random access to the communication propagation paths. To provide the desired communication between two stations on the common propagation path, the transmitted signal is coded with the address code of the stations with which it is desired to communicate to provide the multiple user capability for the communication system. Consequently, the receiver of this addressed station must be placed in synchronism with this coded waveform to extract the intelligence transmitted to it in the form of voice, data, or the like. The receiver is also locked to the phase of the carrier signal to generate a reference for synchronous detection of the received signal and the intelligence contained in the received signal. Because of the nature of the coded waveform, both the radio frequency (RF) carrier and the coder clock frequencies are synchronously derived. At first glance, it would appear that the synchronization problem would be solved when carrier lock and coarse code alignment occur. However, for proper operation it is necessary to bring the codes generated at the transmitter (code received at the receiver) and the code generated at the receiver into much closer synchronism which is an order of magnitude better than the coarse phase alignment. It should be noted that though the RF carrier and transmitter code generator drive are synchronously derived as are the receiver counterparts, the fact that the receiver master oscillator is phase locked to the received carrier signal does not imply phase coherence with the master oscillator or clock in the transmitter. A phase ambiguity results because the carrier signal is a multiple of the master clock frequency. Consequently, though the master oscillator in the receiver locks to the received carrier signal, it can have any one of $n$ phase values relative to the transmitter reference derived from the transmitter master oscillator, where $n$ is the multiplying factor. Additionally, the received code and the locally generated code can be offset by several cycles of the master oscillator because the code drive is a signal derived by dividing down the master oscillator frequency. Consequently, the basic problem consists of varying the master oscillator phase (frequency) such that the receiver code generator becomes properly aligned with the received coded signal while still maintaining RF phase lock.

Previous synchronization systems overcoming the phase ambiguity mentioned hereinabove have required two independent loops, one for code locks and one for carrier locks. These prior art systems have several disadvantages:

a. The necessity of locking two loops where one loop will do;

b. The need of reliable switchover to eventually one loop control after code synchronization, since it is desirable to stop sending subcarrier information at this time such that the full transmitter power is available for message signals;

c. To avoid undue interference, it is desirable to use narrow band circuitry. This necessitates use of crystal oscillators whose control characteristics may be marginal for proper loop operation in the divided down code generator drive circuit.

Other techniques for code locks have employed systems such as tau-modulation or early-late gate circuits, each of which suffer from similar disadvantages as mentioned hereinabove with respect to the double-phase locked loop arrangement.

SUMMARY OF THE INVENTION

An object of the present invention is to provide a synchronization system in a synchronous receiver having the carrier and code generator clock frequencies synchronously derived from a single master oscillator wherein synchronization of both the RF carrier signal and the code generator phase is accomplished in one control loop utilizing quantized rate control of the master oscillator.

Another object of the present invention is to provide a synchronization system for a synchronous receiver having an improvement over the above described prior art devices wherein synchronization of the local RF carrier and code generator phase is accomplished in one control loop.

Still another object of this invention is the provision of a synchronization system for a synchronous receiver wherein only one master oscillator is employed which is controlled by a single conventional phase locked loop to synchronize the local RF carrier signal with the received RF carrier signal and the local code generator phase is synchronized with the received code signal by opening the single-phase locked loop and applying a quantized rate control signal to the single master oscillator.

A feature of this invention is to provide a synchronization system for a synchronous receiver to synchronize the output signal of the receiver voltage control master oscillator with a received signal including a carrier signal predeterminately coded at a subcarrier signal rate and the subcarrier signal comprising: a first source of the received signal; first means coupled to the oscillator and the first source to generate a local subcarrier signal equal in frequency to the received subcarrier signal and a local carrier signal equal in frequency to the received carrier signal coded according to the predetermined code and to synchronously detect the received signal in response to the local carrier signal; a phase lock loop, including the oscillator, coupled to the first means to control the phase output signal of the oscillator when the phase difference between the received and local carrier signals is within a given range of phase differences; and second means coupled to the first means and the loop responsive to the relative phase difference between the received and local subcarrier signals when the received and local carrier signals is within the given range to produce a first-phase correcting control signal, to open the loop to enable control of the phase of the output signal of the oscillator by the control signal, and to close the loop for control of said oscillator by said loop, said control signal and said loop cooperating to establish and maintain the desired synchronization between the received and local carrier signals and the received and local subcarrier signals.

Another feature of the present invention is to provide the above-described synchronization system with a third means coupled to the first means activated when the phase difference of the received and local carrier signals is outside the given range to adjust the relative phase difference between the received and local carrier signals to be within the given range.

BRIEF DESCRIPTION OF THE DRAWING

The above-mentioned and other features and objects of this invention will become more apparent by reference to the following description taken in conjunction with the sole FIGURE of the drawing which is a block diagram of a synchronous communication system employing a synchronization system in accordance with the principles of this invention.

DESCRIPTION OF THE PREFERRED EMBODIMENT

Referring to the FIGURE, there is illustrated therein a transmitter and receiver for a synchronous communication system having multiple user capability which employs the synchronization system in accordance with the principles of this invention. At the transmitter, oscillator 1 is employed as the transmitter reference from which is derived the RF carrier signal by frequency multiplier 2 and subcarrier signal derived by frequency divider 3. The output from multiplier 2 is coupled to modulator 4 while the output divider 3 is coupled to code generator 5 and also to modulator 4. Code generator 5 may be a shift register having proper feedback connection to provide the desired address code for multiple user capability. The coded output signal of generator 5 is coupled to modulator 4 to code the carrier signal produced by multiplier 2. There is also applied to modulator 4 intelligence signal from source 6, such as voice or other intelligence signals. The output of modulator 4 is then coupled to power amplifier 7 for transmission by antenna 8 to the receiving antenna 9. It should be noted that the carrier signal, the transmitted subcarrier signal and the subcarrier drive for code generator 5 are synchronously derived from master oscillator 1. It should be further noted that either the intelligence of source 6 or the subcarrier from divider 3 are transmitted to efficiently employ the full power of the transmitter to transmit the intelligence. The subcarrier of divider 3 is only transmitted during the synchronization period of the communication system.

Receiver master oscillator 10 which is a voltage-controlled oscillator has its output signal coupled to frequency multiplier 11 to derive the local carrier signal. The same output signal of oscillator 10 is coupled to frequency divider 32 to derive a local subcarrier signal. The output from multiplier 11 is coupled to modulator 12 which has its other input coupled to code generator 13. Generator 13 is identical in structure to code generator 5 of the transmitter to produce the same address code which is modulated on the local carrier signal by modulator 12. The output signal of modulator 12 is coupled to synchronous detector 14 to synchronously detect the received signal coupled to antenna 9. When the phase differences between the local and received RF carrier and between the received and local code phase are within a prescribed phase difference range, the drive for code generator 13 is provided by frequency divider 32, as in the case of the drive for code generator 5 in the transmitter, detector 14 provides an output of only the subcarrier signal, or the intelligence signal. However, if these phase differences are outside the prescribed phase difference range, detector 14 will provide a noise output.

When synchronized, the output of detector 14 is coupled to IF amplifier 15, and hence, to synchronous detector 16 having its other input coupled to the output of oscillator 10 to derive the intelligence signal for application to utilization device 17. Synchronous detector 16 and utilization device 17 are only for the purpose of deriving the intelligence signal placed on the carrier signal at the transmitter and does not play a role in the synchronization system of this invention.

To achieve coarse code alignment, receiver code generator 13 is swept relative to the received transmitter code by varying the drive frequency applied thereto. When the codes are within a coarse or given range of phase differences, code generator 13 is driven by the divided down master clock at the output of divider 32 through the switching arrangement of coarse sync circuit 18. For purposes of illustration, coarse sync circuit 18 may include the following components as illustrated in the FIGURE. The output from IF amplifier 15 is coupled to signal-to-noise ratio detector 19. As mentioned hereinabove, when the phase difference of the local and received carrier and code phase is outside the given range of phase differences the output of IF amplifier 15 will look like noise. This will result in a very low, or no output level from detector 19. The output of detector 19 is coupled to threshold device 20 which has a threshold level set to an acceptable level of signal-to-noise ratio to indicate that the phase difference of the local and received signals are within the given range of phase difference. Thus, with a low signal-to-noise ratio detected in detector 19 threshold 20 will produce no output which is coupled to INHIBIT gate 21 to place this INHIBIT gate in operation to couple the output signal of swept frequency generator 22 through OR-gate 23 to act as a variable frequency drive for code generator 13. As soon as the signal-to-noise ratio as detected in detector 19 is above the threshold of device 20 INHIBIT gate 21 will be inhibited stopping the application of the output signal from generator 22 to code generator 13 and will enable AND-gate 24 to apply the output of divider 32 through OR-gate 23 to generator 13 for the desired drive frequency therefore. During this time of coarsely adjusting the phase of the local and received codes, master oscillator 10 is phase locked to the incoming carrier. This is accomplished in a phase locked loop including RF phase detector 25 coupled to the output of IF amplifier 15 and oscillator 10. The detected phase difference is then applied to low pass filter 26 and switching circuit 27 to oscillator 10 to control the phase of the output signal of this oscillator to cause the phase difference between this output signal to be of proper phase so that the locally generated carrier signal at the output of multiplier 11 and the received carrier signal are within the given range of phase differences.

As mentioned hereinabove, in the section "Background of the Invention," a phase ambiguity results because the carrier signal is a multiple of the master oscillator frequency. Consequently, though the master oscillator in the receiver locks to the received carrier, it can have any one of $n$ phase values relative to the transmitter reference, the output signal of oscillator 1, where $n$ is the multiplying factor. Additionally, the local code from generator 13 and the received code can be offset by several cycles of the master oscillator signal because the code drive is divided down from the master oscillator frequency. Consequently, the basic problem consists of varying the receiver master oscillator phase (frequency) such that the receiver code generator provides a code which is properly aligned with the incoming code signal while still maintaining RF carrier phase lock.

The circuitry to provide this fine sync lock includes the RF phase lock loop, rate control generator 28, decision circuit 29, code phase detector 30 and switching circuit 27. Because of the phase ambiguities described above, a synchronously derived subcarrier is transmitted and compared with the locally derived reference subcarrier signal at the output of divider 32. The incoming or received subcarrier signal is extracted at the output of phase detector 25 and is compared to the reference subcarrier signal in code phase detector 30. The output of detector 30 is a voltage proportional to the magnitude and sense of the existing code phase difference. This voltage is filtered in low pass filter 31 and applied to decision circuit 29 to make a decision as to what control is necessary to provide the proper phasing of master oscillator 10. In the instant system, a three level decision is made, namely, a plus correction as determined by an output from detector 33, a minus correction as determined by an output from detector 34, and no correction as determined by no output from both detectors 33 and 34. The operation of detectors 33 and 34 is under control of a timing signal derived from the output of divider 32. These detectors 33 and 34 are merely shown by way of example and could employ an AND gate to assure operation at the desired time as controlled by the timing signal from divider 32 and a properly biased threshold circuit to assure that an output is properly produced to cause the proper correction, both in polarity and magnitude, of the frequency or phase of oscillator 10. The outputs from decision circuit 29 are coupled to switching circuit 27 to determine whether the loop will remain closed for coarse adjustment of the phase of the oscillator 10 or whether the locked loop will be open to permit a quantized rate control of the phase of oscillator 10 as provided by the output signal of generator 28. Switching circuit 27 is shown merely by way of example as including INHIBIT gate 36 having one normal input coupled to the output of filter 26 and two inhibiting inputs, one coupled to detector 33 and the other coupled to detector 34. In addition, AND-gates 37 and 38 are coupled, respectively, to detectors 33 and 34 and to the output of generator 28. To provide the minus correction for oscillator 10, NOT 39 is provided at the output of AND 38. The output from NOT 39 as well as the outputs from AND 37 and INHIBIT 36 are coupled through OR 40 to the control input of oscillator 10.

If no subcarrier correction is needed as detected by no output from both detectors 33 and 34, logic circuit 27 maintains the phase-locked loop operative to maintain RF carrier lock. However, if a plus or a minus correction is required as detected by detector 33 and 34, circuit 27 opens the phase-locked loop and switches control from the output of detector 25 to the output of generator 28. The output signal of generator 28 can be shaped to meet the various needs; that is, it can be a pulse, a ramp voltage, a nonlinear voltage or the like. For the proposed application in this invention, it is desirable to use a pulse within prescribed amplitude and time duration limits (pulse area), such as illustrated for purposes of explanation by curve 41. By opening the RF phase-locked loop and coincidentally applying a step voltage from generator 28 to oscillator 10, the frequency of this oscillator will change by a fixed amount proportional to the sense and area of the pulse.

The operation of this fine synchronization arrangement will now be discussed. When the phase difference of the local carrier signal and received carrier signal is outside the given range of phase difference, detector 30 will produce a high-frequency output which is not passed by filter 31 to the decision circuit 29. Thus, there will be "0" output from each of the detectors 33 and 34. This "0" output from detectors 33 and 34 will effectively inhibit the operation of AND's 38 and 37 and will not inhibit the operation of INHIBIT 36, which maintains the RF phase locked loop closed by gating INHIBIT 36. On the other hand, if there is an in-phase condition within the given range of phase difference, there will be a "0" from filter 31 with a "0" output from detectors 33 and 34. Thus, due to INHIBIT gate 36 will maintain the RF phase-lock loop closed. On the other hand, when there is an out of phase condition in the fine sync range there will be a "1" output from either the plus or minus correction detectors 33 and 34. These outputs from detectors 33 and 34 will inhibit passage of the control signal on the RF phase-locked loop through the operation of INHIBIT 36 and will permit the application of the output signal of generator 28 to provide the quantized rate control of oscillator 10. In this condition, let it be assumed that there is a "1" output from detector 33 which indicates a plus correction. Let us assume that this indicates that the local code phase is lagging the received code phase, thus, it is necessary to provide a positive pulse as shown in curve 41 to oscillator 10 through OR-gate 40 to provide the desired increase of frequency to achieve the proper synchronized relationship between the received signal and master oscillator 10. On the other hand, if detector 34 produces a "1" output this indicates that there is a minus correction necessary which would indicate that the local output signal from oscillator 10 is leading the received signal. Thus, to assure synchronization it is necessary to decrease the frequency of oscillator 10. This dictates the need for a negative going pulse and this is provided by NOT 39 at the output of AND 38 which then is applied through OR 40 to control oscillator 10 appropriately to achieve the desired synchronization.

The phase of output signal of oscillator 10 and, hence, the phase of the code produced by generator 13 will change by an amount proportional to the area of the pulse produced by generator 28. It should be noted that the phase of the master clock will vary with respect to the received RF carrier but since the phase locked loop is opened during this interval no feedback control exists. After the step voltage is removed, the phase locked loop is permitted to function normally and will relock. To ensure a positive locking action, the new phase of master oscillator 10 output signal must be within a prescribed 90° zone relative to the received carrier phase. Consequently, the change in master oscillator output signal phase during each rate control interval is made approximately equal to an integral number of RF carrier signal cycles. Note that the phase locked loop can readily relock in this situation because of the *n*-phase relationships permissible between the carrier signal and the output signal of the master oscillator. The process of examining the relative subcarrier phases can now be repeated and a new decision made about master oscillator phase control. This cycle continues until the phase of the code output of generator 13 is within the prescribed limits relative to the code of the received signal.

The application of a pulse to master oscillator 10 produces a step change in frequency which is equivalent to a linear rate of change of phase from which the term "rate control" arises. The degree of such control is varied in discrete steps of RF carrier cycles, hence, the term "quantized." It should again be noted that this does not limit the process to quantized rate control should the application demand other specifically shaped control characteristics.

While we have described above the principles of our invention in connection with specific apparatus, it is to be clearly understood that this description is mainly made only by way of example and not as a limitation to the scope of our invention as set forth in the objects thereof and in the accompanying claims.

We claim:

1. A synchronization system for a synchronous receiver to synchronize the output signal of the receiver voltage controlled master oscillator with a received signal including a carrier signal both coded by a subcarrier signal that has been coded by a predetermined code and modulated by said subcarrier signal comprising:
- a first source of said received signal;
- first means coupled to said oscillator and said first source to generate a local subcarrier signal equal in frequency to said received subcarrier signal and a local carrier signal equal in frequency to said received carrier signal coded according to said predetermined code and to synchronously detect said received signal in response to said local carrier signal;
- a phase-locked loop, including said oscillator, coupled to said first means to control the phase of the output signal of said oscillator when the phase difference between said received and local carrier signals is within a given range of phase differences; and
- second means coupled to said first means and said loop responsive to the relative phase difference between said received and local subcarrier signals when said received and local carrier signals is within said given range to produce a first phase correcting control signal, to open said loop to enable control of the phase of the output signal of said oscillator by said control signal, and to close said loop for control of said oscillator by said loop;
- said control signal and said loop cooperating to establish and maintain the desired synchronization between said received and local carrier signals and said received and local subcarrier signals.

2. A system according to claim 1, wherein said first means includes
- synchronous detector means coupled to said first source,
- frequency multiplier means coupled to said oscillator to produce said local carrier signal,
- modulator means coupled to an input of said detector means and the output of said multiplier means,
- code generator means coupled to said modulator means to code said local carrier signal according to said predetermined code, and
- frequency divider means coupled to said oscillator and said generator means to produce said local subcarrier signal and employ the same as the drive for said generator means.

3. A system according to claim 2, further including
- third means coupled to said detector means to produce a first control signal when said phase difference between said received and local carrier signals is outside said given range and a second control signal when said phase difference between said received and local carrier signals is within said given range;

swept frequency generator means, and logic circuit means coupled to said swept frequency generator means, said code generator means and said frequency divider means responsive to said first control signal to couple the swept frequency output signal of said swept frequency generator means to said code generator means as a drive signal therefore and responsive to said second control signal to couple said local subcarrier signal to said code generator means as a drive signal therefore.

4. A system according to claim 1, further including third means coupled to said first means activated when said phase difference is outside said given range to adjust the relative phase difference between said received and local carrier signals to be within said given range.

5. A system according to claim 4, wherein said third means includes fourth means coupled to said first means responsive to the synchronously detected output therefrom to produce a first control signal when said phase difference of said received and local carrier signals is outside said given range and a second control signal when said phase difference between said received and local carrier signals is within said given range, a swept frequency generator means, and logic circuit means coupled to said generator means and said first means responsive to said first control signal to couple the swept frequency output signal of said generator means to said first means to adjust the code phase of said coded local carrier signal and responsive to said second control to couple said local subcarrier signal to said first means to maintain the code phase of said coded carrier signal synchronous with the code phase of said coded received carrier signal.

6. A system according to claim 4, wherein said first means includes synchronous detector means coupled to said first source, frequency multiplier means coupled to said oscillator to produce said local carrier signal, modulator means coupled to an input of said detector means and the output of said multiplier means, code generator means coupled to said modulator means to code said local carrier signal according to said predetermined code, and frequency divider means coupled to said oscillator to produce said local subcarrier signal;

said third means includes fourth means coupled to said synchronous detector means to produce a first control signal when said phase difference between said received and local carrier signals is outside said given range and a second control signal when said phase difference between said received and local carrier signals is within said given range;

swept frequency generator means, and first logic circuit means coupled to said swept frequency generator means, said code generator means and said frequency divider means responsive to said first control signal to couple the output signal of said swept frequency generator means to said code generator means as a drive signal therefore and responsive to said second control signal to couple said local subcarrier signal to said code generator as a drive signal therefore;

said loop further includes first phase detector means coupled to said oscillator and said synchronous detector means responsive to the output signal of said synchronous detector means and the output signal of said oscillator to produce a second phase correcting control signal, and filter means coupled to said first phase detector means and said oscillator to couple said second phase correcting control signal to said oscillator to control the phase of the output signal thereof to reduce said phase difference between said received and local carrier signals; and said second means includes second phase detector means coupled to said frequency divider means and the output of said first phase detector means to detect said phase difference between said received and local subcarrier signals, decision circuit means having three decision levels coupled to said second phase detector means, a second source of control voltage having a pulse characteristic employed as said first phase correcting control signal, and second logic circuit means coupled to said decision circuit means and said second source and between said filter means and said oscillator responsive to the output signal of said decision circuit means to open said loop and apply said control voltage to said oscillator to control the phase of the output signal therefrom by a fixed amount proportional to the polarity and area of said pulse characteristic to synchronize said local and received subcarrier signals and to close said loop upon synchronization of said subcarrier signals and when said phase difference of said received and local carrier signals is outside said given range.

7. A system according to claim 1, wherein said loop further includes phase detector means coupled to said oscillator and said first means responsive to the synchronously detected output signal of said first means and the output signal of said oscillator to produce a second phase correcting control signal, and filter means coupled to said phase detector means and said oscillator to couple said second phase correcting control signal to said oscillator to control the phase of the output signal thereof to reduce said phase difference between said received and local carrier signals.

8. A system according to claim 1, wherein said second means includes phase detector means coupled to said first means and said loop to detect said phase difference between said received and local subcarrier signals, decision circuit means coupled to said phase detector means, a second source of control voltage having a given characteristic employed as said first phase correcting control signal, and logic circuit means coupled to said decision circuit means and said second source and in said loop responsive to the output signal of said decision circuit means to open said loop and apply said control voltage to said oscillator to control the phase of the output signal therefrom according to said given characteristic to establish and maintain said synchronization and to close said loop upon synchronization and when said phase difference of said received and local carrier signals is outside said range.

9. A system according to claim 8, wherein said control voltage has a pulse characteristic; and the phase of the output signal of said oscillator is controlled by a fixed amount proportional to the polarity and area of the pulses.

10. A system according to claim 8, wherein said decision circuit includes fourth means to provide a plus correction signal, a minus correction signal and a no correction signal;

said control voltage has a pulse characteristic; and the phase of the output signal of said oscillator is controlled by a fixed amount proportional to one polarity and area of the pulses in response to one of said plus and minus correction signal and by a fixed amount proportion to the other polarity and area of the pulses in response to the other of said plus and minus correction signals and is not controlled by said pulse characteristic in response to said no correction signal.

* * * * *